Jan. 7, 1964   J. L. WOODFILL ETAL   3,117,195
PNEUMATIC TIRE AND ELECTRIC SWITCH FOR PRESSURE INDICATOR
Filed March 1, 1962
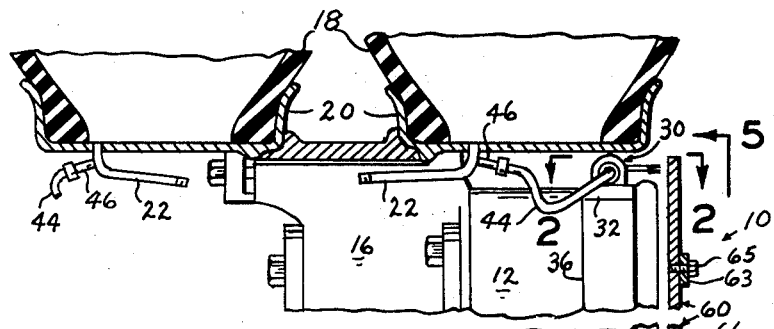
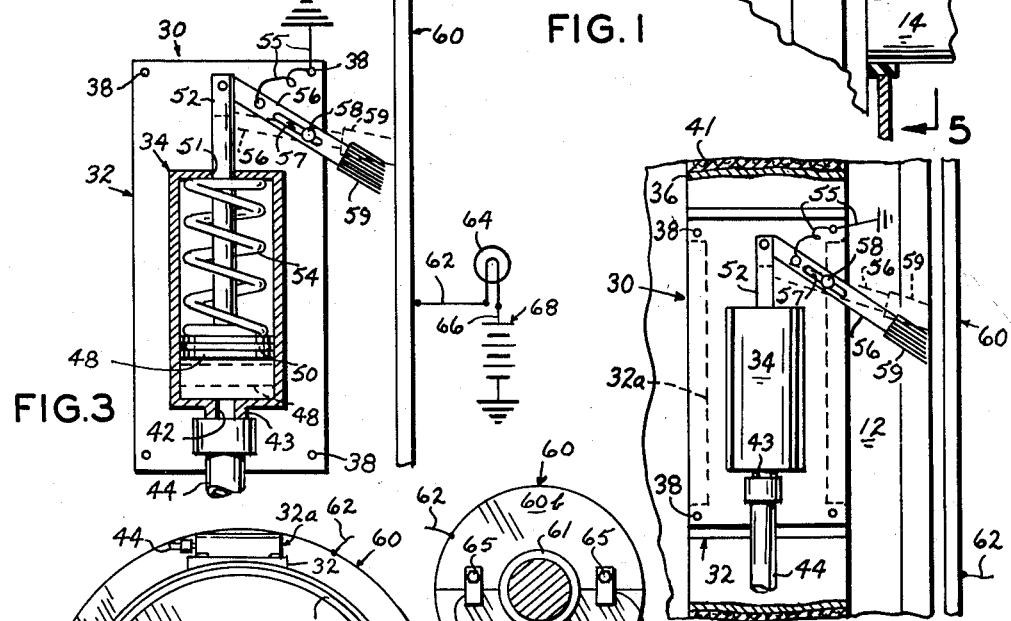
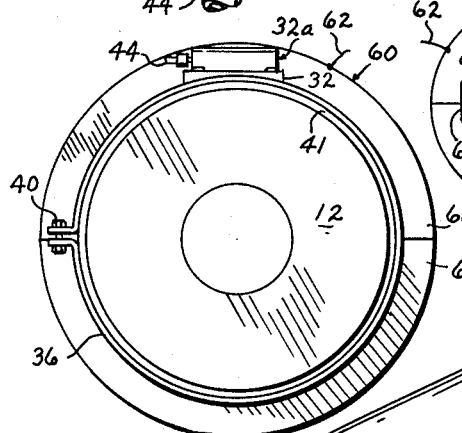
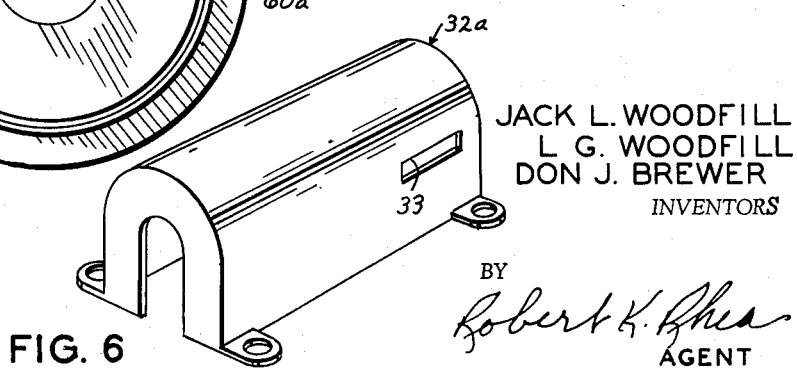
JACK L. WOODFILL
L. G. WOODFILL
DON J. BREWER
INVENTORS
BY
Robert K. Rhea
AGENT United States Patent Office 3,117,195
Patented Jan. 7, 1964

3,117,195
PNEUMATIC TIRE AND ELECTRIC SWITCH
FOR PRESSURE INDICATOR
Jack L. Woodfill, Rte. 1, Powell, Mo.; L. G. Woodfill,
Mustang, Okla. (730 SE. 31, Oklahoma City, Okla.);
and Don J. Brewer, Rte. 1, Box 97, Shawnee, Okla.
Filed Mar. 1, 1962, Ser. No. 176,659
2 Claims. (Cl. 200—61.25)

The present invention relates to trucks and more particularly to a low pressure tire indicator.

It is highly desirable from an economic and safety standpoint to provide some means for the driver of a transport truck to be able to determine when one or more of the tires on the truck-tractor or trailer has lost or is loosing air. Under inflated tires tend to develop heat to such an extent that a fire is generated, some times resulting in the loss of the trailer and its contents or the under inflated tire will cause the other tire or tires in tandem wheel construction to carry an additional load which might damage the tire or result in a blow-out. The prior art reveals a number of pneumatic tire under inflated warning devices but none or few of these devices have been accepted by the trucking industry because of their complexity, initial cost and ease with which they become inoperative.

It is, therefore, the principal object of the instant invention to provide a low pressure tire indicator which is relatively simple in construction and which will not easily get out of order under normal driving conditions.

Another object is to provide a warning device of this class which remains in operation whether the truck is in motion or at a standstill.

Another object is to provide a device of this class which, in addition to warning of an under inflated condition of the tires, also aids in the prevention of fire.

Another object is to provide a device of this class which is actuated by the air pressure within the tire and which does not interfere with testing or adding air to the tire through the conventional valve stem.

The present invention accomplishes these and other objects by connecting a contact plate to the axle in spaced relation with respect to the brake drum of the truck and mounting an air pressure sensing unit on the brake drum for rotation therewith. A flexible tube connects the air presusre sensing unit to the valve stem of the tire. Wiring interconnects the contact plate and a warning indicator located in the truck cab to the vehicle battery.

Other objects will be apparent from the following description when taken in conjunction with the accompanying single sheet of drawings, wherein:

FIGURE 1 is a fragmentary elevational view, partly in section, illustrating the device in operative position;

FIGURE 2 is a fragmentary top plan view taken substantially along the line 2—2 of FIG. 1;

FIGURE 3 is a horizontal cross-sectional view through the air pressure sensing unit and including a wiring diagram;

FIGURE 4 is a side elevational view illustrating the manner of connecting the air sensing unit to a brake drum;

FIGURE 5 is a side elevational view of the contact plate taken substantially along the line 5—5 of FIG. 1; and, FIGURE 6 is a perspective view of a cover for the air sensing unit.

Like characters of reference designate like parts in those figures of the drawings in which they occur.

In the drawings:

The reference numeral 10 indicates, as a whole, a fragment of a tandem wheel unit of a transport truck including a brake drum 12 mounted on an axle housing 14 and a tire rim support means 16 connected to the drum which holds a pair of pneumatic tires 18 and their mounting rims 20. A conventional valve stem 22 is connected to each rim 20 for inflating and deflating the tires.

The reference numeral 30 indicates a pressure sensing unit comprising a base plate 32 having a hollow housing 34 mounted thereon. The base plate 32 is connected to a band-like clamp member 36 by bolts or rivets 38. The band clamp 36 circumferentially surrounds the brake drum 12 and frictionally grips the latter for rotation therewith by bolt means 40 connecting opposed flanged end edges of the clamp 36 (FIG. 4). A band-like ring of heat insulating material, such as a strip of asbestos 41, is interposed between the band 40 and the periphery of the brake drum 12. The housing 34 is circular in cross section and has an opening 42 extending through an externally threaded boss 43 at one end of the housing for connection with one end of a flexible tube 44 which is connected at its other end to a valve stem connecting unit 46 which is in turn connected to the respective valve stem 22 intermediate the ends of the latter. The valve stem connecting unit 46 includes a conventional air core, not shown, which is held in open position by the tube 44 when it is connected thereto to provide communication between the respective tire and the interior of the housing 34.

A piston 48 is closely received by the bore of the housing and is sealed with the wall thereof by means of an O-ring 50. A piston rod 52 is axially connected to the piston 48 and extends outwardly of the housing 34 through a suitable opening 51 in the housing end opposite the boss 43. A spring 54 is interposed between the piston 48 and the inward surface of the piston rod supporting end of the housing for normally urging the piston toward the housing opening 42. An arm 56 is pivotally connected at one end to the free end of the piston rod 52. A slot 57, formed in the arm 56 intermediate its ends, slidably and pivotally connects the arm to the base plate 32 by a stationary pin 58 mounted on the base 32. The free end of the arm 56 projects laterally of the housing 34 and brake drum 12. A contact brush 59, comprising a plurality of relatively small wires, is secured at one end to the free end of the arm 56. The arm 56 is grounded to the base plate 32 and brake drum 12 by a wire 55.

A split ring stationary contact plate 60 is connected to a peripheral portion of the axle housing 14 adjacent the brake drum 12 and projects circumferentially outward of the cylindrical surface generated by the periphery of the brake drum. An electrical insulating gasket 61 is interposed between the ring 60 and the axle housing 14. Strap-like brackets 63 are secured at one end to one section 65a of the plate 60 and are connected at their other ends to the other section 60b of the plate 60 by bolts 65 to hold the plate 60 in position on the axle housing. A dust and mud protective housing cover 32a (FIG. 6) surrounds the housing 32 and a portion of the arm 56. The arm 56 projects outwardly of the cover 32a through a suitable slot 33 formed in one side thereof.

Air pressure within the tire normally forces the piston 48 away from the opening 42 thus maintaining the free end of the arm 56 and brush 59 in spaced relation with respect to the stationary contact plate 60. When the air pressure, within the tire 18, is reduced below a selected minimum the spring 54 urges the piston 48 toward the housing opening 42 thus pivoting the free end of the arm 56 toward the plate 60, as shown by dotted lines (FIGS. 2 and 3), so the brush 59 contacts the plate 60. This completes a circuit from the brake drum 12 through a wire 62 connected at one end to the plate 60 and connected at its other end with a lamp 64. The other contact of the lamp 64 is connected by a wire 66 to a source of electrical energy, such as a battery 68, which is grounded to the truck frame.

Obviously the invention is susceptible to some change or alteration without defeating its practicability, and we therefore do not wish to be confined to the preferred embodiment shown in the drawings and described herein, further than we are limited by the scope of the appended claims.

We claim:

1. A low pressure tire indicator for a vehicle having an axle and a wheel mounted thereon, comprising: an air pressure sensing unit adapted for connection and rotation with the periphery of the brake drum of the vehicle wheel, said wheel having a pneumatic tire mounted thereon provided with a valve stem, said pressure sensing means including a base, a housing mounted on the base and having a bore forming a cylinder; tubing means connected with one end of the housing and communicating with the valve stem of said tire; a piston within the cylinder; a piston rod connected to the piston and extending outwardly of the end of said housing opposite its connection with said tubing means; a split ring contact plate secured to the axle of the vehicle in spaced relation with respect to the brake drum; gasket means electrically insulating said contact plate from said axle; an arm pivotally connected at one end to the free end of said piston rod and slidably connected intermediate its ends to said base for movement of its free end toward and away from said contact plate by the movement of said piston in response to changes of air pressure within the tire; and a spring surrounding said piston rod within the cylinder and normally urging said piston toward that end of the housing connected with said tubing means.

2. A low pressure tire indicator for a vehicle having an axle housing, a brake drum, a wheel and a pneumatic tire mounted thereon, said tire having a valve stem, comprising: a contact plate mounted on and electrically insulated from said axle housing in spaced relation with respect to said brake drum; an air pressure sensing unit mounted on the periphery of said brake drum for rotation therewith, said pressure sensing unit including a base and a hollow housing having a bore therein forming a cylinder; tubular means connecting one end of said cylinder with said valve stem for communication therebetween; a piston within said cylinder; a piston rod connected at one end to said piston and projecting outwardly beyond the end of said hollow housing opposite said tubular means; a spring surrounding said piston rod within said cylinder and normally urging said piston toward that end of the cylinder in communication with said valve stem; an arm pivotally connected at one end with the free end of said piston rod and slidably connected intermediate its ends to said base for movement of the free end of said arm toward and away from said contact plate by the movement of said piston in response to air pressure changes within said tire and said cylinder; and a contact brush connected with the free end of said arm.

References Cited in the file of this patent
UNITED STATES PATENTS 2,655,571   Loggins _____ Oct. 15, 1953
3,007,320   Henkel _____ Nov. 7, 1961